United States Patent
Hata

(10) Patent No.: US 10,160,264 B2
(45) Date of Patent: Dec. 25, 2018

(54) PNEUMATIC TIRE

(71) Applicant: The Yokohama Rubber Co., LTD., Minato-ku, Tokyo (JP)

(72) Inventor: Hiroshi Hata, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 180 days.

(21) Appl. No.: 14/432,985

(22) PCT Filed: Sep. 30, 2013

(86) PCT No.: PCT/JP2013/076555
§ 371 (c)(1),
(2) Date: Apr. 1, 2015

(87) PCT Pub. No.: WO2014/054584
PCT Pub. Date: Apr. 10, 2014

(65) Prior Publication Data
US 2015/0251495 A1    Sep. 10, 2015

(30) Foreign Application Priority Data
Oct. 3, 2012 (JP) .................. 2012-221009

(51) Int. Cl.
*B60C 9/14* (2006.01)
*B60C 9/20* (2006.01)
(Continued)

(52) U.S. Cl.
CPC ............. *B60C 9/14* (2013.01); *B29D 30/30* (2013.01); *B29D 30/3042* (2013.01);
(Continued)

(58) Field of Classification Search
CPC ......... B60C 9/02; B60C 9/0207; B60C 9/023; B60C 9/14; B60C 9/18; B60C 9/20
See application file for complete search history.

(56) References Cited

U.S. PATENT DOCUMENTS

3,625,271 A * 12/1971 Hutch .................... B60C 15/00
                                                                  152/540
4,815,514 A    3/1989 Hara et al.
2009/0095397 A1    4/2009 Neubauer et al.

FOREIGN PATENT DOCUMENTS

JP    S62-241704    10/1987
JP    04090902    * 3/1992
(Continued)

OTHER PUBLICATIONS

International Search Report for International Application No. PCT/JP2013/076555 dated Dec. 24, 2013, 4 pages, Japan.

*Primary Examiner* — Justin R Fischer
(74) *Attorney, Agent, or Firm* — Thorpe North & Western

(57) ABSTRACT

A pneumatic tire includes a strip member which extends in a tire circumferential direction, with both ends thereof reaching each bead portion, and a belt layer disposed in a tread portion on an outer side in the tire radial direction of the strip members. The strip members are divided in the tire width direction, with each of the divided strip members having joints that join in the tire circumferential direction. The relative positions of the joints are disposed at less than 20° in the tire circumferential direction within the region of the maximum width TW in the tire width direction of the belt layer.

17 Claims, 14 Drawing Sheets

(51) Int. Cl.
    *B60C 9/02*         (2006.01)
    *B29D 30/30*       (2006.01)
    *B29D 30/70*       (2006.01)
    *B60C 5/14*         (2006.01)
    *B60C 15/00*       (2006.01)
    *B29D 30/42*       (2006.01)

(52) U.S. Cl.
    CPC ................ *B29D 30/70* (2013.01); *B60C 5/14* (2013.01); *B60C 9/023* (2013.01); *B60C 9/0207* (2013.01); *B60C 15/0009* (2013.01); *B29D 2030/423* (2013.01); *B29D 2030/705* (2013.01); *B60C 2005/147* (2013.01); *Y10T 152/10855* (2015.01)

(56) References Cited

FOREIGN PATENT DOCUMENTS

| | | | |
|---|---|---|---|
| JP | H04-146122 | | 5/1992 |
| JP | H05-221204 | | 8/1993 |
| JP | H11-286059 | | 10/1999 |
| JP | 2001-039110 | | 2/2001 |
| JP | 2002-205510 | | 7/2002 |
| JP | 2007196746 | * | 8/2007 |
| JP | 2009-096463 | | 5/2009 |
| JP | 2012-076662 | | 4/2012 |
| JP | 2013-146933 | | 8/2013 |

* cited by examiner

|  |  | Conventional Example | Comparative Example 1 | Working Example 1 | Working Example 2 | Working Example 3 | Working Example 4 | Working Example 5 | Working Example 6 | Working Example 7 | Working Example 8 |
|---|---|---|---|---|---|---|---|---|---|---|---|
| Carcass layer | Divided or not | × | ○ | ○ | ○ | ○ | ○ | ○ | ○ | ○ | ○ |
|  | Joint position less than 20° | - | × | ○ | ○ | ○ | ○ | ○ | ○ | ○ | ○ |
|  | Plurality of joints disposed in the tire circumferential direction | - | One joint | One joint | Uniform | Non-uniform | Non-uniform | Non-uniform | Non-uniform | Non-uniform | Non-uniform |
| Inner liner layer | Divided or not | × | × | × | × | × | × | × | × | × | × |
|  | Joint position less than 20° | - | - | - | - | - | - | - | - | - | - |
|  | Plurality of joints disposed in the tire circumferential direction | - | - | - | - | - | - | - | - | - | - |
| Joint position in the same layer of the carcass layer and the inner liner layer are less than 20° |  | - | - | - | - | - | - | - | - | - | - |
| Joint positions coincide |  | - | - | - | - | - | - | - | - | - | - |
| Divided width of carcass layer (percentage of maximum width of belt layer) (%) |  | 0 | 0 | 0 | 0 | 0 | -35 | -30 | 50 | 95 | 97 |
| Uniformity (LFV) |  | 100 | 100 | 102 | 102 | 104 | 104 | 104 | 104 | 104 | 104 |
| Tire Weight |  | 100 | 100 | 100 | 100 | 100 | 95 | 100 | 105 | 110 | 112 |
| Durability |  | ○ | ○ | ○ | ○ | ○ | ○ | ○ | ○ | ○ | × |

FIG. 13

Docket No.: 3138-213.PCT.US

| | | Conventional Example | Working Example 2 | Working Example 9 | Working Example 10 | Working Example 11 |
|---|---|---|---|---|---|---|
| Carcass layer | Divided or not | × | × | × | × | × |
| | Joint position less than 20° | - | - | - | - | - |
| | Plurality of joints disposed in the tire circumferential direction | - | - | - | - | - |
| Inner liner layer | Divided or not | × | O | O | O | O |
| | Joint position less than 20° | - | × | O | O | O |
| | Plurality of joints disposed in the tire circumferential direction | - | One joint | One joint | Uniform | Non-uniform |
| Joint position in the same layer of the carcass layer and the inner liner layer are less than 20° | | - | - | - | - | - |
| Joint positions coincide | | - | - | - | - | - |
| Divided width of carcass layer (percentage of maximum width of belt layer) (%) | | - | - | - | - | - |
| Uniformity (LFV) | | 100 | 100 | 102 | 102 | 104 |
| Tire Weight | | 100 | 100 | 100 | 100 | 100 |
| Durability | | O | O | O | O | O |

FIG. 14

| | | Conventional Example | Working Example 3 | Working Example 12 | Working Example 13 | Working Example 14 | Working Example 15 | Working Example 16 |
|---|---|---|---|---|---|---|---|---|
| Carcass layer | Divided or not | × | ○ | ○ | ○ | ○ | ○ | ○ |
| | Joint position less than 20° | - | × | ○ | ○ | ○ | ○ | ○ |
| | Plurality of joints disposed in the tire circumferential direction | - | One joint | One joint | Uniform | Non-uniform | Uniform | Non-uniform |
| Inner liner layer | Divided or not | × | ○ | ○ | ○ | ○ | ○ | ○ |
| | Joint position less than 20° | - | × | ○ | ○ | ○ | ○ | ○ |
| | Plurality of joints disposed in the tire circumferential direction | - | One joint | One joint | Uniform | Uniform | Non-uniform | Non-uniform |
| Joint position in the same layer of the carcass layer and the inner liner layer are less than 20° | | - | × | × | × | × | × | × |
| Joint positions coincide | | - | × | × | × | × | × | × |
| Divided width of carcass layer (percentage of maximum width of belt layer) (%) | | - | 0 | 0 | 0 | 0 | 0 | 0 |
| Uniformity (LFV) | | 100 | 100 | 102 | 102 | 104 | 104 | 106 |
| Tire Weight | | 100 | 100 | 100 | 100 | 100 | 100 | 100 |

FIG. 15A

|  |  | Working Example 17 | Working Example 18 | Working Example 19 | Working Example 20 | Working Example 21 | Working Example 22 | Working Example 23 |
| --- | --- | --- | --- | --- | --- | --- | --- | --- |
| Carcass layer | Divided or not | ○ | ○ | ○ | ○ | ○ | ○ | ○ |
|  | Joint position less than 20° | ○ | ○ | ○ | ○ | ○ | ○ | ○ |
|  | Plurality of joints disposed in the tire circumferential direction | Uniform | Non-uniform | Uniform | Non-uniform | Uniform | Non-uniform | Uniform |
| Inner liner layer | Divided or not | ○ | ○ | ○ | ○ | ○ | ○ | ○ |
|  | Joint position less than 20° | ○ | ○ | ○ | ○ | ○ | ○ | ○ |
|  | Plurality of joints disposed in the tire circumferential direction | Uniform | Uniform | Non-uniform | Non-uniform | Uniform | Uniform | Non-uniform |
| Joint position in the same layer of the carcass layer and the inner liner layer are less than 20° |  | ○ | ○ | ○ | ○ | ○ | ○ | ○ |
| Joint positions coincide |  | × | × | × | × | ○ | ○ | ○ |
| Divided width of carcass layer (percentage of maximum width of belt layer) (%) |  | 0 | 0 | 0 | 0 | 0 | 0 | 0 |
| Uniformity (LFV) |  | 104 | 106 | 106 | 108 | 106 | 108 | 108 |
| Tire Weight |  | 100 | 100 | 100 | 100 | 100 | 100 | 100 |
| Durability |  | ○ | ○ | ○ | ○ | ○ | ○ | ○ |

FIG. 15B

| | | Working Example 24 | Working Example 25 | Working Example 26 | Working Example 27 | Working Example 28 | Working Example 29 |
|---|---|---|---|---|---|---|---|
| Carcass layer | Divided or not | O | O | O | O | O | O |
| | Joint position less than 20° | Non-uniform | O | O | O | O | O |
| | Plurality of joints disposed in the tire circumferential direction | Non-uniform | Non-uniform | Non-uniform | Non-uniform | Non-uniform | Non-uniform |
| Inner liner layer | Divided or not | O | O | O | O | O | O |
| | Joint position less than 20° | Non-uniform | Non-uniform | Non-uniform | Non-uniform | Non-uniform | Non-uniform |
| | Plurality of joints disposed in the tire circumferential direction | O | O | O | O | O | O |
| Joint position in the same layer of the carcass layer and the inner liner layer are less than 20° | | O | O | O | O | O | O |
| Joint positions coincide | | 0 | -35 | -30 | 50 | 95 | 97 |
| Divided width of carcass layer (percentage of maximum width of belt layer) (%) | | 110 | 110 | 110 | 110 | 110 | 110 |
| Uniformity (LFV) | | 100 | 95 | 100 | 105 | 110 | 112 |
| Tire Weight | | O | O | O | O | O | × |
| Durability | | | | | | | |

FIG. 15C

PNEUMATIC TIRE

TECHNICAL FIELD

The present technology relates to a pneumatic tire, and more particularly relates to a pneumatic tire with improved strip members, such as carcass layers, inner liner layers and the like, which extend in the tire circumferential direction, both ends thereof in the tire width direction reaching each of the bead portions.

BACKGROUND

Conventionally, for example, in Japanese Unexamined Patent Application No. H05-221204A, a pneumatic tire (radial pneumatic tire) is disclosed in which both ends of a carcass layer extending in the tire circumferential direction are butt spliced, and both ends of an inner liner layer arranged on a tire inner side of this carcass layer, made of impermeable rubber, and extending in the tire circumferential direction are lap spliced, and in which there is a region where the carcass layer butt splice and the inner liner layer lap splice are overlapped.

Also conventionally, for example, in Japanese Unexamined Patent Application No. H11-286059A, a pneumatic tire manufacturing method is disclosed in which tire assembly components are formed by dividing the carcass layer and the inner liner layer in two in the tire width direction, and these tire assembly components are combined, and the belt plies and tread portion are added and the tire is assembled and vulcanized.

The strip members, such as the carcass layer and the inner liner layer and the like, which extend in the circumferential direction, both ends thereof reaching each of the bead portions, are configured so that both ends in the tire circumferential direction are joined (spliced), as in the pneumatic tire disclosed in Japanese Unexamined Patent Application No. H05-221204A described above. However, when the carcass layer and the inner liner layer are divided in two in the tire width direction as in the pneumatic tire disclosed in Japanese Unexamined Patent Application No. H11-286059A and the tire assembly components are joined, the relative positions of the joints of each strip member that are opposite each other in the tire width direction may be deviated from each other. In this case, there is a possibility that the uniformity will deteriorate due to non-uniformity of the force acting with respect to the tire width direction (Lateral Force Variation: LFV), in particular in the tread region between the maximum width in the tire width direction of the belt layer. In recent years, it has become desirable to resolve this type of problem in order to further improve tire performance.

SUMMARY

The present technology provides a pneumatic tire that is capable of improving uniformity.

The pneumatic tire according to a first embodiment is a pneumatic tire including: a strip member which extends in a tire circumferential direction, both ends thereof in a tire width direction reaching each of the bead portions; and a belt layer disposed in a tread portion on an outer side in a tire radial direction of the strip member; the strip member being divided in the tire width direction; the divided strip members having joints that join together in the tire circumferential direction; and relative positions of the joints being disposed at less than 20° in the tire circumferential direction within a region of a maximum width in the tire width direction of the belt layer.

According to this pneumatic tire, the relative positions of the joints of each of the divided strip members in the tire width direction are disposed within a region in the tire circumferential direction corresponding to the ground contact length. The region described above is easily affected by the forces acting in the tire width direction (LFV), and by disposing the relative positions of the joints in the region corresponding to the ground contact length, the forces acting in the tire width direction cancel each other out, and the peak force acting in the tire width direction is reduced, so it is possible to improve the uniformity.

Also, the pneumatic tire according to a second embodiment is the first embodiment wherein the strip member is at least one selected from a carcass layer having both ends thereof in the tire width direction fold around each of the bead portions, or an inner liner layer that is applied to the tire inner surface.

According to this pneumatic tire, by configuring at least one of the carcass layer and the inner liner layer within the region of the maximum width in the tire width direction of the belt layer as described above, it is possible to obtain a significant effect of improvement in uniformity.

Also, the pneumatic tire according to a third embodiment is the second embodiment wherein if the strip member includes the carcass layer and the inner liner layer, the relative positions of the joints of the carcass layer and the inner liner layer that are opposite each other in the tire width direction are disposed in the same layer at less than 20° in the tire circumferential direction within the region of the maximum width in the tire width direction of the belt layer.

According to this pneumatic tire, by configuring the carcass layer and the inner liner layer as described above, the forces in the tire width direction acting on the carcass layer cancel each other out and the peak force acting in the tire width direction is reduced, and the forces in the tire width direction acting on the inner liner layer cancel each other out and the peak force acting in the tire width direction is reduced, so it is possible to obtain a significant effect of improvement in uniformity.

Also, the pneumatic tire according to a fourth embodiment is any one of the first to third embodiments wherein of each of the strip members that are opposite each other in the tire width direction, the relative positions of the joints that join in the tire circumferential direction coincide in the tire circumferential direction within the region of the maximum width in the tire width direction of the belt layer.

According to this pneumatic tire, by the configuration described above, the forces acting in the tire width direction effectively cancel each other out and the peak force acting in the tire width direction is further reduced, so it is possible to obtain a significant effect of improvement in uniformity.

Also, the pneumatic tire according to a fifth embodiment is any one of the first to fourth embodiments, wherein if the strip member that is divided in the tire width direction has a plurality of joints and a total number of the joints is A, spacing of the joints in the tire circumferential direction is within a range of not less than $(360°/A) \times (+0.7)$ and not greater than $(360°/A) \times (+1.3)$, and the plurality of joints is disposed with non-uniform spacing in the tire circumferential direction.

If the spacing of the plurality of joints in the tire circumferential direction is uniform, the peak positions of the forces acting in the tire width direction become the uniform positions in the tire circumferential direction of one of the strip members that is divided in the tire width direction, and the uniformity improvement effect tends to be small. According to this pneumatic tire, if the spacing of the plurality of joints in the tire circumferential direction is non-uniform spacing, the peak positions of the force acting in the tire width direction become non-uniform positions in the tire circumferential direction of the one strip member that is divided in the tire width direction, and the uniformity improvement effect is increased.

Also, the pneumatic tire according to a sixth embodiment is any one of the first to fifth inventions embodiments, wherein the strip member is a carcass layer which extends in the tire circumferential direction, both ends thereof in the tire width direction fold around each of the bead portions, and a divided width of each of the divided carcass layers is not less than −30% and not greater than 95% of the maximum width in the tire width direction of the belt layer.

If the divided width of the divided carcass layer is less than −30% of the maximum width in the tire width direction of the belt layer (if the overlap is increased), the tire mass tends to increase, and if the divided width exceeds 95% of the maximum width in the tire width direction of the belt layer, the amount of overlap of the carcass layer and the belt layer is reduced, and the tire durability tends to be reduced. Therefore, if the divided carcass layers overlap, it is preferable that the divided width is not less than −30% of the maximum width in the tire width direction of the belt layer, and if the divided edges of the divided carcass layers are separated, it is preferable that the divided width is not greater than 95% of the maximum width in the tire width direction of the belt layer.

The pneumatic tire according to the present technology can improve the uniformity.

BRIEF DESCRIPTION OF THE DRAWINGS

FIG. 13 is a table showing test results for pneumatic tires according to examples of the present technology;

FIG. 14 is a table showing test results for pneumatic tires according to examples of the present technology;

FIGS. 15A-15C include a table showing test results for pneumatic tires according to examples of the present technology;

DETAILED DESCRIPTION

An embodiment of the present technology is described below in detail based on the drawings. However, the present technology is not limited to this embodiment. Also, the constituent elements of the embodiment include those that can be easily replaced by those skilled in the art or those substantially same as the constituent elements in the embodiment. Furthermore, the multiple modified examples described in the embodiment can be combined as desired within the scope apparent to a person skilled in the art.

Figure 1:
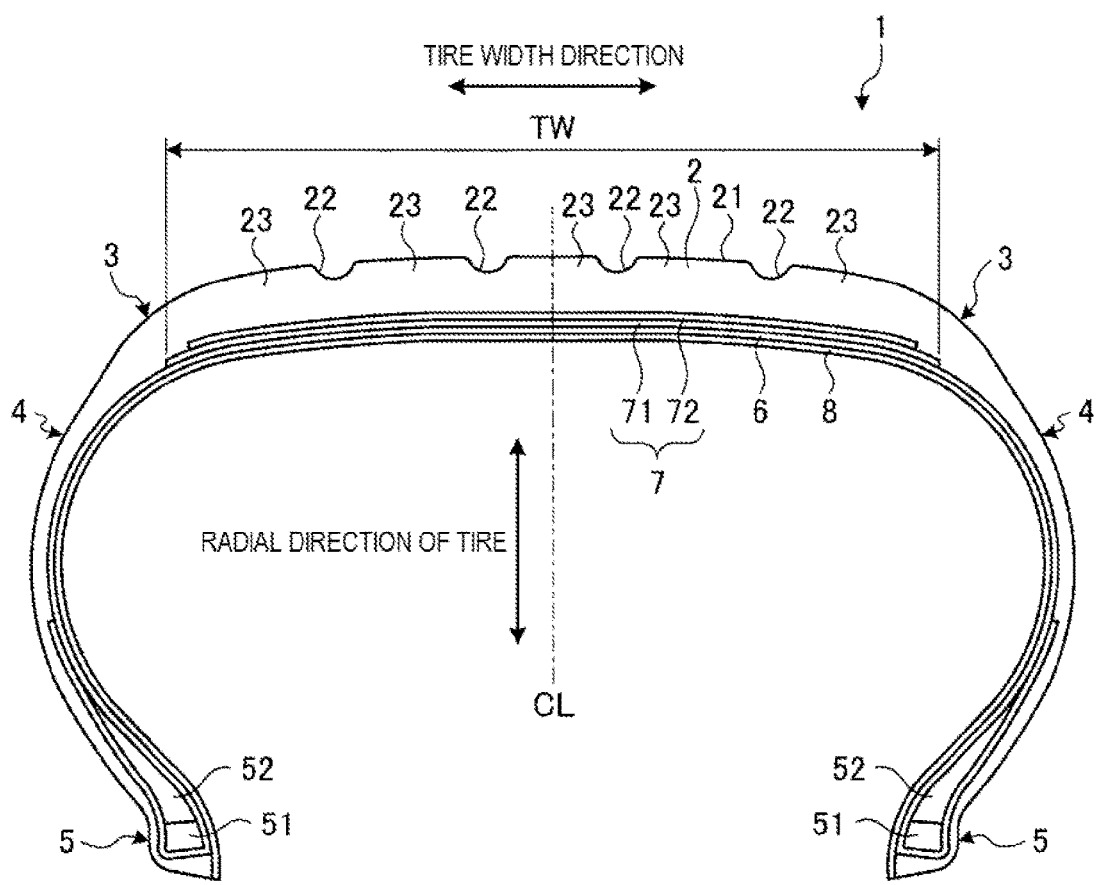
FIG. 1 is a meridian cross-sectional view showing a pneumatic tire according to an embodiment of the present technology.

FIG. 1 is a meridian cross-sectional view showing a pneumatic tire according to the present embodiment. In the following description, "tire radial direction" refers to a direction orthogonal to a rotational axis (not shown) of a pneumatic tire 1; "inner side in the tire radial direction" refers to a side facing the rotational axis in the tire radial direction; and "outer side in the tire radial direction" refers to a side distanced from the rotational axis in the tire radial direction. "Tire circumferential direction" refers to a circumferential direction with the rotational axis as a center axis. Additionally, "tire width direction" refers to a direction parallel to the rotational axis; "inner side in the tire width direction" refers to a side facing a tire equatorial plane (tire equator line) CL in the tire width direction; and "outer side in the tire width direction" refers to a side distanced from the tire equatorial plane CL in the tire width direction. "Tire equatorial plane CL" refers to a plane that is orthogonal to the rotational axis of the pneumatic tire 1 and that passes through a center of a tire width of the pneumatic tire 1. The tire width is a width in the tire width direction between elements located to the outside in the tire width direction, i.e., a distance between the elements that are farthest from the tire equatorial plane CL in the tire width direction. "Tire equator line" refers to a line along the tire circumferential direction of the pneumatic tire 1 that lies on the tire equatorial plane CL. In this embodiment, "tire equator line" is given the same reference symbol "CL" as that given to the tire equatorial plane.

As shown in FIG. 1, the pneumatic tire 1 of this embodiment includes a tread portion 2, shoulder portions 3 on both sides of the tread portion 2, and a sidewall portion 4 and a bead portion 5 continuing sequentially from each of the shoulder portions 3. The pneumatic tire 1 also includes a carcass layer 6, a belt layer 7, and an inner liner 8.

The tread portion 2 is formed from a rubber material (tread rubber), is exposed on the outermost side in the tire radial direction of the pneumatic tire 1, and a surface thereof constitutes a profile of the pneumatic tire 1. A tread surface 21 is formed on a peripheral surface of the tread portion 2, i.e., on a tread that contacts a road surface when traveling. A plurality (four in this embodiment) of main grooves 22 that extend in the tire circumferential direction is provided on the tread surface 21. Moreover, a plurality of rib-like land portions 23 extending along the tire circumferential direction is formed in the tread surface 21 by the plurality of main grooves 22. Additionally, while not explicitly illustrated in the drawings, lug grooves that intersect the main grooves 22 in each of the land portions 23 are provided in the tread surface 21. The land portions 23 are divided into a plurality of segments in the tire circumferential direction by the lug grooves. Furthermore, the lug grooves are formed so as to open to an outermost side in the tire width direction of the tread portion 2, that is, the outer side in the tire width direction. Note that the lug grooves may have a form that communicates with the main grooves 22 or may have a form that does not communicate with the main grooves 22.

The shoulder portions 3 are regions on both outer sides in the tire width direction of the tread portion 2. Moreover, the sidewall portions 4 are exposed on the outermost side in the tire width direction of the pneumatic tire 1. The bead portions 5 each include a bead core 51 and a bead filler 52. The bead core 51 is formed by winding a bead wire that is a steel wire into a ring shape. The bead filler 52 is a rubber member that is disposed in the space formed by wrapping around ends of the carcass layer 6 in the tire width direction at the position of the bead core 51.

The carcass layer constitutes a strip member of the present embodiment, and both of the ends in the tire width direction are wrapped over the pair of bead cores 51 from the inner side in the tire width direction outward in the tire width direction and extend upwards to the outer side in the tire radial direction, and the carcass layer 6 is extended in a toroidal shape in the tire circumferential direction to form the framework of the tire. At least one layer of this carcass layer 6 is provided. The carcass layer 6 is constituted by a plurality of carcass cords (not shown) juxtaposed in the tire circumferential direction along the tire meridian direction having a given angle with respect to the tire circumferential direction, and is covered by coating rubber. The carcass cords are formed from organic fibers (polyester, rayon, or nylon). Alternatively, the carcass layer 6 may be formed from thermoplastic resin sheet. The thermoplastic resin sheet contains a thermoplastic resin or a thermoplastic elastomer composition in which elastomer components are blended into a thermoplastic resin, so the thermoplastic resin sheet includes no cords.

Examples of such a thermoplastic resin used in the present embodiment include polyamide resins (nylon 6 (N6), nylon 66 (N66), nylon 46 (N46), nylon 11 (N11), nylon 12 (N12), nylon 610 (N610), nylon 612 (N612), nylon 6/66 copolymers (N6/66), nylon 6/66/610 copolymers (N6/66/610), nylon MXD6, nylon 6T, nylon 9T, nylon 6/6T copolymers, nylon 66/PP copolymers, and nylon 66/PPS copolymers); polyester resins (aromatic polyesters such as polybutylene terephthalate (PBT), polyethylene terephthalate (PET), polyethylene isophthalate (PEI), polybutylene terephthalate/tetramethylene glycol copolymers, PET/PEI copolymers, polyarylate (PAR), polybutylene naphthalate (PBN), liquid crystal polyester, and polyoxyalkylene diimidic diacid/polybutylene terephthalate copolymers); polynitrile resins (polyacrylonitrile (PAN), polymethacrylonitrile, acrylonitrile/styrene copolymers (AS), (meth) acrylonitrile/styrene copolymers, and (meth)acrylonitrile/styrene/butadiene copolymers); poly(meth)acrylate resins (polymethylmethacrylate (PMMA), polyethylmethacrylate, ethylene ethyl acrylate copolymers (EEA), ethylene acrylate copolymers (EAA), and ethylene methyl acrylate resins (EMA)); polyvinyl resins (vinyl acetate (EVA), polyvinylalcohol (PVA), vinyl alcohol/ethylene copolymers (EVOH), polyvinylidene chloride (PVDC), polyvinyl chloride (PVC), vinyl chloride/vinylidene chloride copolymers, and vinylidene chloride/methylacrylate copolymers); cellulose resins (cellulose acetate and cellulose acetate butyrate); fluorine resins (polyvinylidene fluoride (PVDF), polyvinyl fluoride (PVF), polychlorofluoroethylene (PCTFE), and tetrafluoroethylene/ethylene copolymers (ETFE)); imide resins (aromatic polyimide (PI)); and the like.

Examples of elastomers used in the present embodiment include diene rubbers and hydrogenates thereof (NR, IR, epoxidized natural rubber, SBR, BR (high-cis BR and low-cis BR), NBR, hydrogenated NBR, and hydrogenated SBR); olefin rubbers (ethylene propylene rubber (EPDM, EPM), maleated ethylene propylene rubber (M-EPM); butyl rubber (IIR); isobutylene and aromatic vinyl or diene monomer copolymers; acrylic rubber (ACM); ionomer; halogen-containing rubbers (Br-IIR, Cl-IIR, brominated copolymer of isobutylene/para-methyl styrene (Br-IPMS), chloroprene rubber (CR), hydrin rubber (CHC, CHR), chlorosulfonated polyethylene (CSM), chlorinated polyethylene (CM), and maleated chlorinated polyethylene (M-CM)); silicone rubbers (methyl vinyl silicone rubber, di-methyl silicone rubber, and methyl phenyl vinyl silicone rubber); sulfur-containing rubbers (polysulfide rubber); fluororubbers (vinylidene fluoride rubbers, fluorine-containing vinyl ether rubbers, tetrafluoroethylene-propylene rubbers, fluorine-containing silicone rubbers, and fluorine-containing phosphazene rubbers); thermoplastic elastomers (styrene elastomers, olefin elastomers, polyester elastomers, urethane elastomers, and polyamide elastomers); and the like.

The belt layer 7 has a multi-layer structure where at least two belt layers 71, 72 are stacked. The belt layer 7 is disposed on the outer side in the tire radial direction that is the periphery of the carcass layer 6 in the tread portion 2, and covers the carcass layer 6 in the tire circumferential direction. The belt layers 71 and 72 are constituted by a plurality of cords (not shown) juxtaposed at a predetermined angle with respect to the tire circumferential direction (e.g. 20 degrees to 30 degrees), and covered with coating rubber. The cords are formed from steel or organic fibers (polyester, rayon, nylon, or the like). Moreover, the overlapping belt layers 71 and 72 are disposed so that the cords thereof mutually intersect.

The inner liner layer 8 constitutes a strip member of the present embodiment; is the tire inner surface, i.e. the inner circumferential surface of the carcass layer 6; has both ends in the tire width direction reach the pair of bead portions 5; and is extended in the tire circumferential direction into a toroidal shape. The inner liner layer 8 is provided to prevent diffusion of air molecules to the tire outer side. The inner liner layer 8 is formed from butyl rubber. Alternatively, the inner liner layer 8 may be formed from a thermoplastic resin sheet, similarly to the carcass layer 6.

Figure 2:
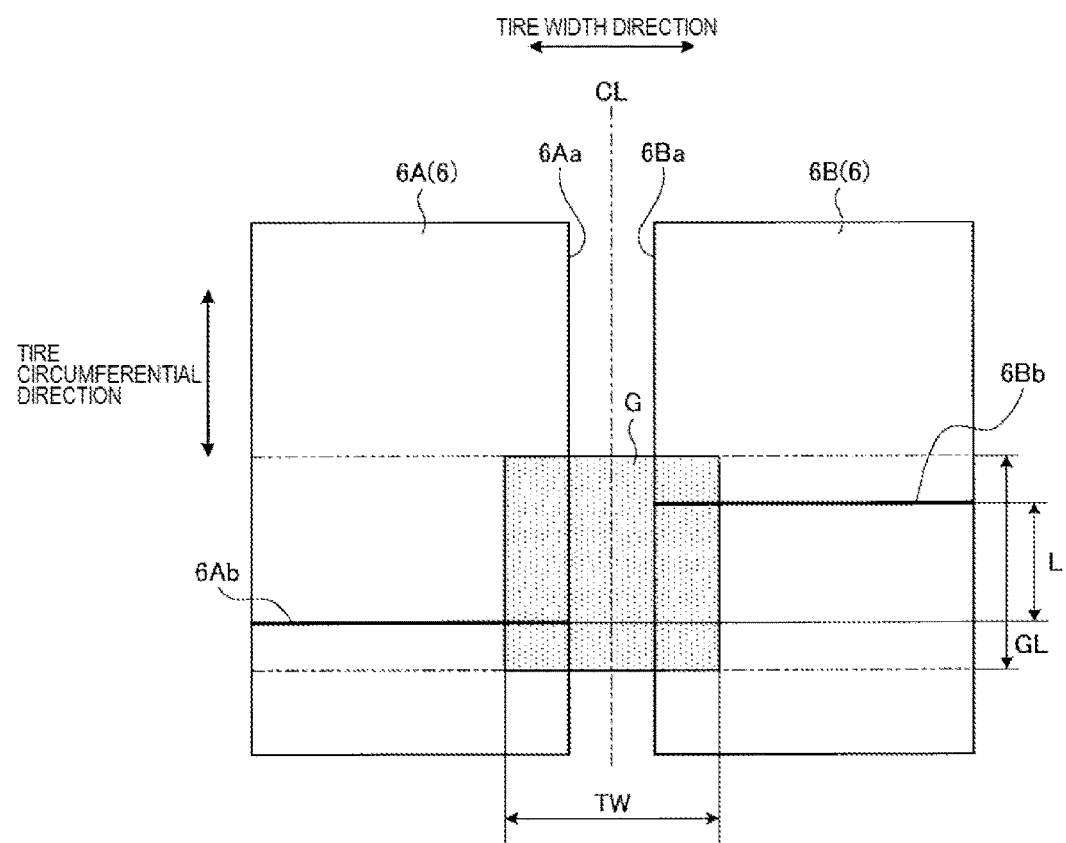
FIG. 2 is a partial enlarged developed view of a strip member showing a joint in the pneumatic tire according to the embodiment of the present technology.
Figure 3:
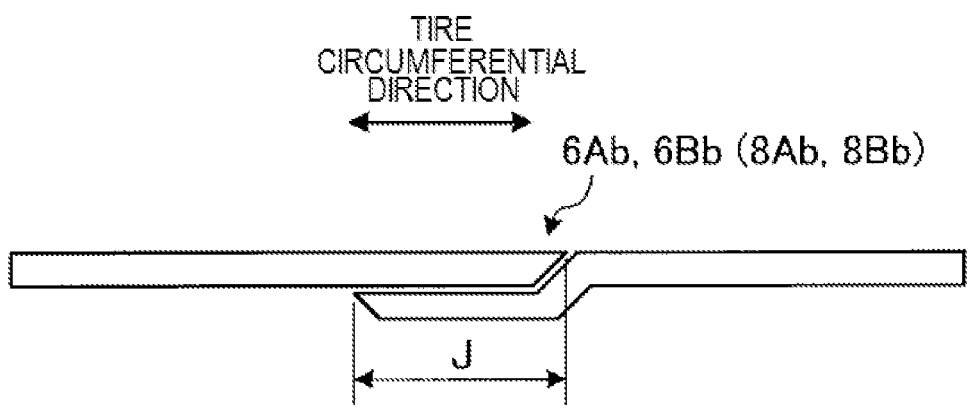
FIG. 3 is an enlarged view showing a joint in the pneumatic tire according to the embodiment of the present technology.
Figure 4:
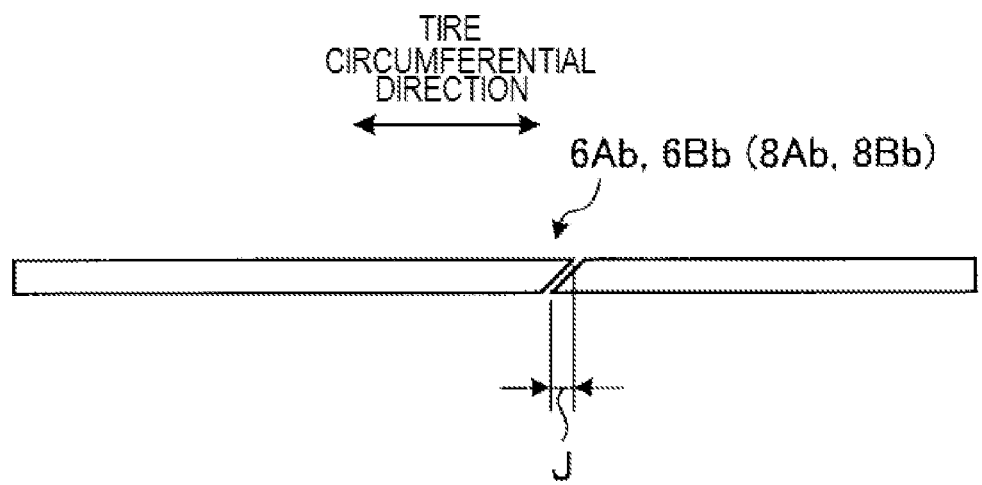
FIG. 4 is an enlarged view showing a joint in the pneumatic tire according to the embodiment of the present technology.
Figure 5:
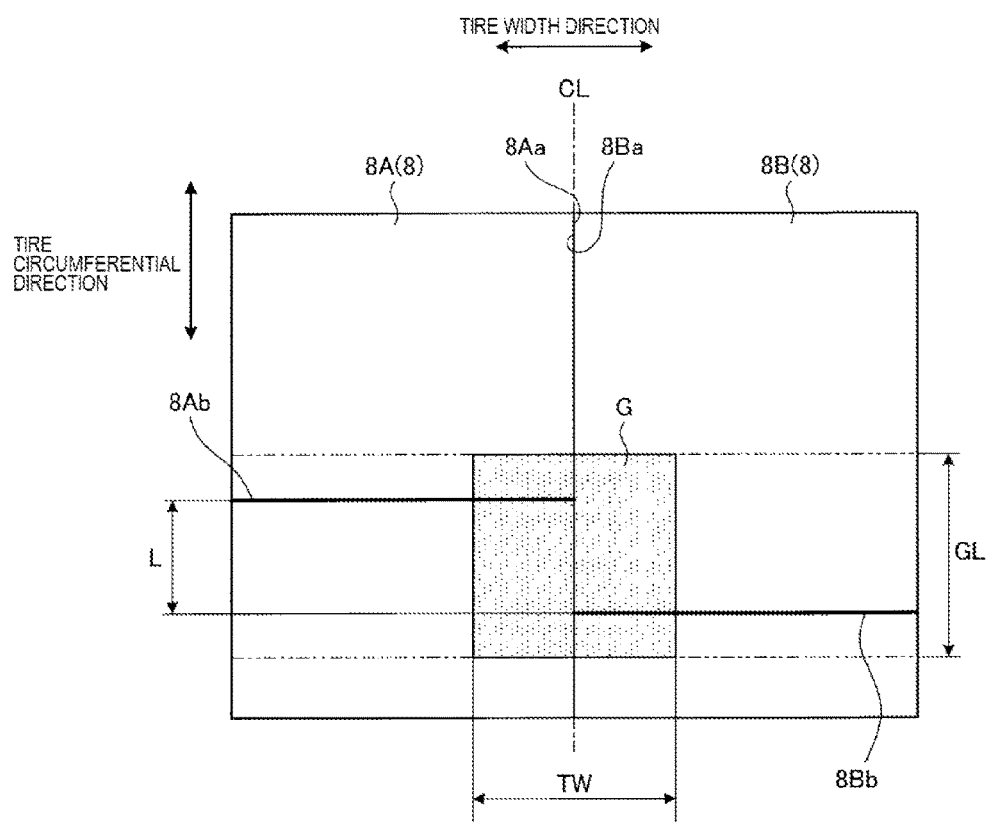
FIG. 5 is a developed view of a strip member showing a joint in the pneumatic tire according to the embodiment of the present technology.
Figure 6:
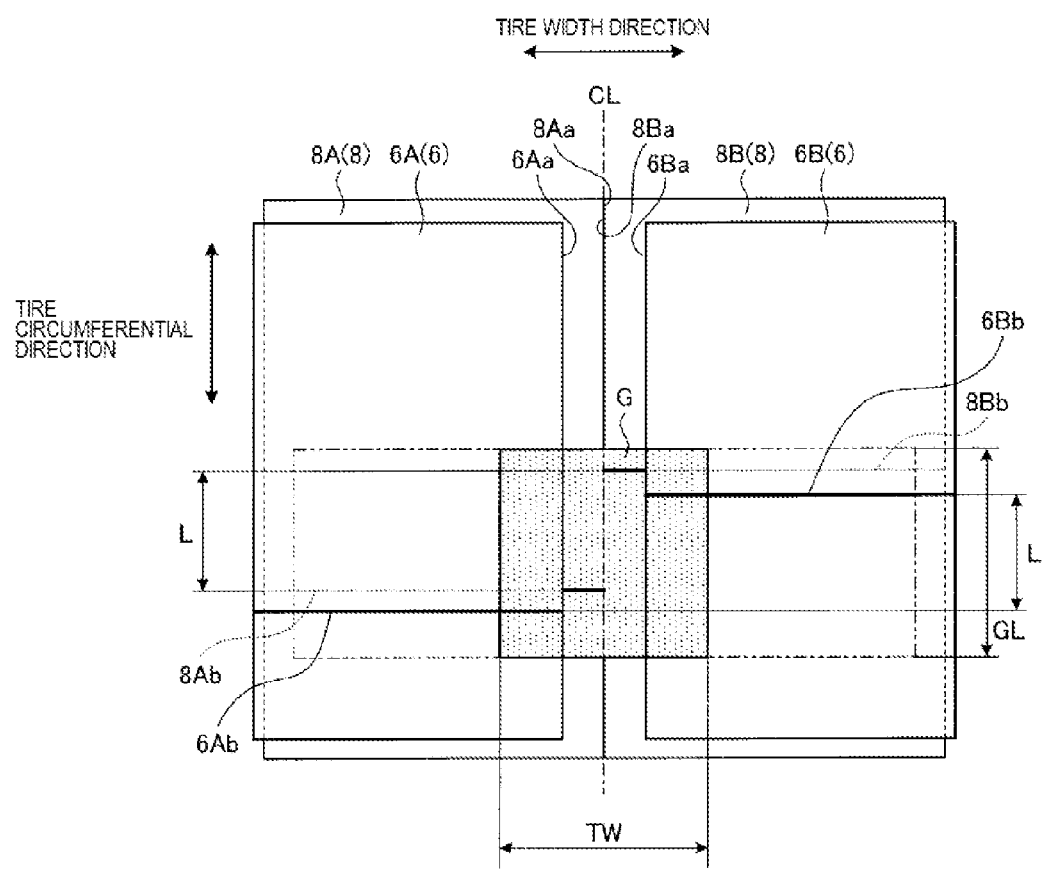
FIG. 6 is a developed view of a strip member showing a joint in the pneumatic tire according to the embodiment of the present technology.

FIG. 2 is a partial enlarged developed view of the strip member (carcass layer) showing a joint in the pneumatic tire according to the present embodiment, FIGS. 3 and 4 are enlarged views showing a joint in the pneumatic tire according to the present embodiment, FIG. 5 is a developed view of the strip member (inner liner layer) showing a joint in the pneumatic tire according to the present embodiment, FIG. 6 is a developed view of the strip member (carcass layer and inner liner layer) showing a joint in the pneumatic tire according to the present embodiment, and FIGS. 7 to 10 are developed views of the strip member (carcass layer) showing an example of arrangement of a joint in the pneumatic tire according to the present embodiment.

The strip members of the pneumatic tire 1 according to the present embodiment, namely the carcass layer 6 and the inner liner layer 8, are divided in the tire width direction.

FIG. 2 shows the carcass layer 6 that is the strip member in a divided state, with the divided carcass layer 6 shown as divided carcass layers 6A and 6B. Furthermore, in FIG. 2, the carcass layer 6 (divided carcass layers 6A and 6B) is shown without showing a portion thereof in the tire circumferential direction and a portion thereof on the bead portion 5 side in the radial direction. The divided carcass layers 6A and 6B are disposed, with the divided edges 6Aa and 6Ba thereof opposite each other with a gap therebetween. Although not shown, the divided edges 6Aa and 6Ba of the divided carcass layers 6A and 6B may be disposed butted against each other. In this case the position of the butt may be on the tire equator line CL, or may be off the tire equator line CL. Alternatively, although not shown, the divided carcass layers 6A and 6B may be disposed with the divided edges 6Aa and 6Ba overlapping each other.

Each of the divided carcass layers 6A and 6B is extended in the tire circumferential direction, and include joints 6Ab and 6Bb, respectively in which the two edges opposite to each other in the tire circumferential direction are joined to each other. Here, the joints 6Ab and 6Bb are joined so that the two edges that are opposite each other in the tire circumferential direction are overlapped, as shown in FIG. 3, or are joined so that the two edges that are opposite each other in the tire circumferential direction overlap each other by being bevelled and butted together, as shown in FIG. 4. In FIG. 2, these joints 6Ab and 6Bb are indicated linearly.

Furthermore, the relative positions of the joints 6Ab and 6Bb of the divided carcass layers 6A and 6B of the carcass layer 6 are disposed within the region of the maximum width TW in the tire width direction of the belt layer 7, as shown in FIGS. 1 and 2, and disposed at less than 20° in the tire circumferential direction when the pneumatic tire 1 is assembled onto a regular rim and filled with the regular inner pressure under no load conditions. As shown in FIG. 2, the region L of 20° in the tire circumferential direction is a region equivalent to the ground contact length GL in commonly used pneumatic tires 1. In other words, the relative positions of the joints 6Ab and 6Bb in the respective divided carcass layers 6A and 6B are disposed in a region corresponding to the ground contact length GL of the normal pneumatic tire 1. The joints 6Ab and 6Bb have the width J in the tire circumferential direction as described above, and are disposed so that this width J falls within a range of 20° or less in the tire circumferential direction.

Here, the ground contact length GL is the maximum straight line distance in the tire circumferential direction of the ground contact patch (ground contact patch: indicated by reference symbol G in the drawing) between the tire and a flat plate when the pneumatic tire 1 is assembled onto the regular rim and filled with the regular inner pressure and a load corresponding to a regular load is applied to the tire with the tire placed perpendicularly to the flat plate in a stationary state. The ground contact patch G is indicated as a substantially rectangular patch in the drawing, but actually has a bag shape without corners. Furthermore, the ground contact patch G is shown on the drawing as having the same width as the ground contact width, which is the maximum straight line width in the tire width direction, and the maximum width TW in the tire width direction of the belt layer 7, but the width of the ground contact patch G is not limited to this.

Note that the "regular rim" refers to a "standard rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). The "regular inner pressure" refers to "maximum air pressure" defined by JATMA, a maximum value in "tire load limits at various cold inflation pressures" defined by TRA, or "inflation pressures" stipulated by ETRTO. Note that "regular load" refers to "maximum load capacity" defined by JATMA, a maximum value in "tire load limits at various cold inflation pressures" defined by TRA, and "load capacity" defined by ETRTO.

FIG. 5 shows the inner liner layer 8 that is the strip member in a divided state, with the divided inner liner layer 8 shown as divided inner liner layers 8A and 8B. Moreover, in FIG. 5, the inner liner layer 8 (divided inner liner layers 8A and 8B) is shown without showing a portion thereof in the tire circumferential direction and a portion thereof on the bead portion 5 side in the radial direction. The divided inner liner layers 8A and 8B are butt jointed together at the divided edges 8Aa and 8Ba. In this case the position of the butt may be on the tire equator line CL, or may be off the tire equator line CL.

Each of the divided inner liner layers 8A and 8B is extended in the tire circumferential direction, and includes joints 8Ab and 8Bb, respectively in which two edges that are opposite each other in the tire circumferential direction are joined to each other. Here, the joints 8Ab and 8Bb are joined so that the two edges that are opposite each other in the tire circumferential direction overlap each other as shown in FIG. 3, or are joined so that the two edges that are opposite each other in the tire circumferential direction overlap each other by bevelling them and butting them together, as shown in FIG. 4. In FIG. 5, these joints 8Ab and 8Bb are indicated linearly.

Furthermore, the relative positions of the joints 8Ab and 8Bb of the divided inner liner layers 8A and 8B of the inner liner layer 8 are disposed within the region of the maximum width TW in the tire width direction of the belt layer 7 as shown in FIGS. 1 and 5, and disposed at less than 20° in the tire circumferential direction when the pneumatic tire 1 is assembled onto the regular rim and filled with the regular inner pressure under no load conditions. As shown in FIG. 5, the region L of 20° in the tire circumferential direction is a region equivalent to the ground contact length GL in low profile tires in which the ground contact length GL is comparatively short. In other words, the relative positions of the joints 8Ab and 8Bb in each of the divided inner liner layers 8A and 8B are disposed within a region corresponding to the ground contact length GL of the normal pneumatic tire 1. The joints 8Ab and 8Bb have the width J in the tire circumferential direction as described above, and are disposed so that this width J falls within the range of less than 20° in the tire circumferential direction.

In FIG. 6, the strip members which are the carcass layer 6 and the inner liner layer 8 are shown in divided states, i.e., in the combined forms shown in FIGS. 2 and 5. In other words, the relative positions of each of the joints 6Ab and 6Bb of the divided carcass layers 6A and 6B of the carcass layer 6 are disposed within the region of the maximum width TW in the tire width direction of the belt layer 7, as shown in FIGS. 1 and 6, and disposed at less than 20° in the tire circumferential direction when the pneumatic tire 1 is assembled onto the regular rim and filled with the regular inner pressure under no load conditions. In addition, the relative positions of each of the joints 8Ab and 8Bb of the divided inner liner layers 8A and 8B of the inner liner layer 8 are disposed within the region of the maximum width TW in the tire width direction of the belt layer 7 as shown in FIGS. 1 and 6, and disposed at less than 20° in the tire circumferential direction when the pneumatic tire 1 is assembled onto the regular rim and filled with the regular inner pressure under no load conditions.

If the relative positions of the joints 6Ab and 6Bb of the divided carcass layers 6A and 6B and the relative positions of the joints 8Ab and 8Bb of the divided inner liner layers 8A and 8B are disposed at less than 20° in the tire circumferential direction as described above, preferably the relative positions opposite each other of the joint 6Ab of the divided carcass layer 6A and the joint 8Ab of the divided inner liner layer 8A are disposed at less than 20° in the tire circumferential direction, and the relative positions opposite each other of the joint 6Bb of the divided carcass layer 6B and the joint 8Bb of the divided inner liner layer 8B are disposed at less than 20° in the tire circumferential direction.

Figure 7:
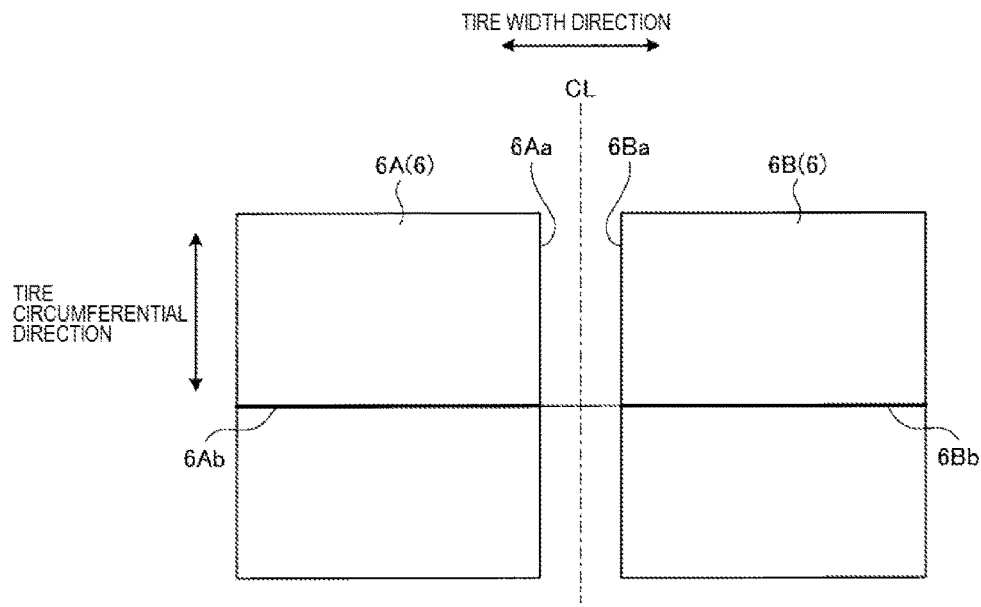
FIG. 7 is a developed view of a strip member showing an example of the arrangement of a joint in the pneumatic tire according to the embodiment of the present technology.
Figure 8:
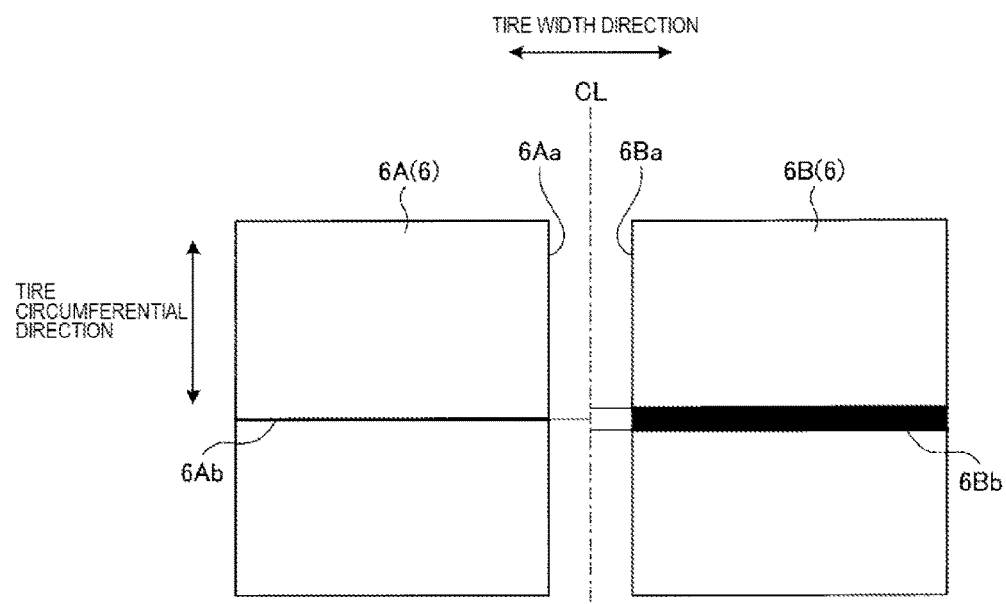
FIG. 8 is a developed view of a strip member showing an example of the arrangement of a joint in the pneumatic tire according to the embodiment of the present technology.
Figure 9:
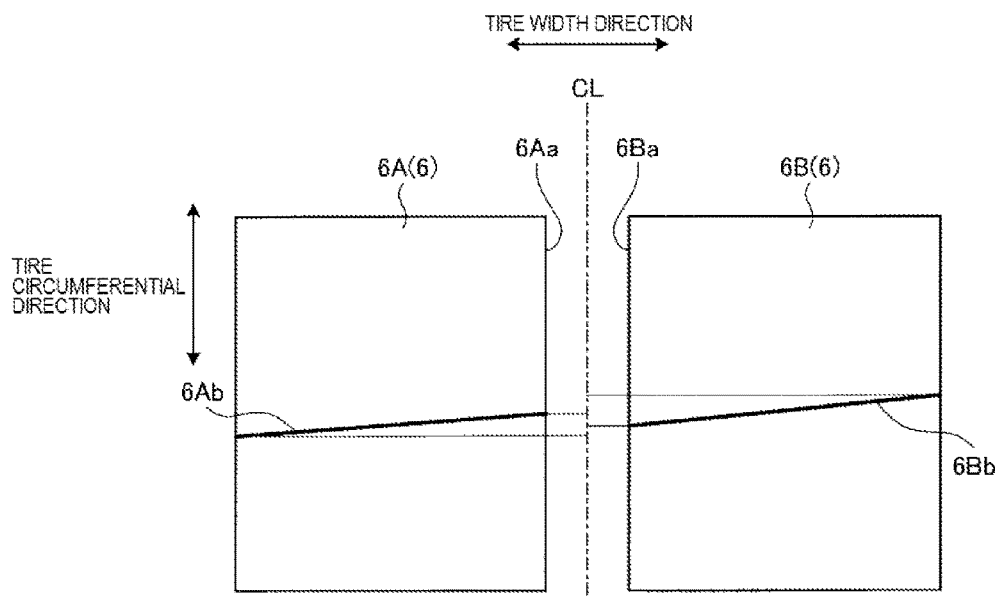
FIG. 9 is a developed view of a strip member showing an example of the arrangement of a joint in the pneumatic tire according to the embodiment of the present technology.
Figure 10:
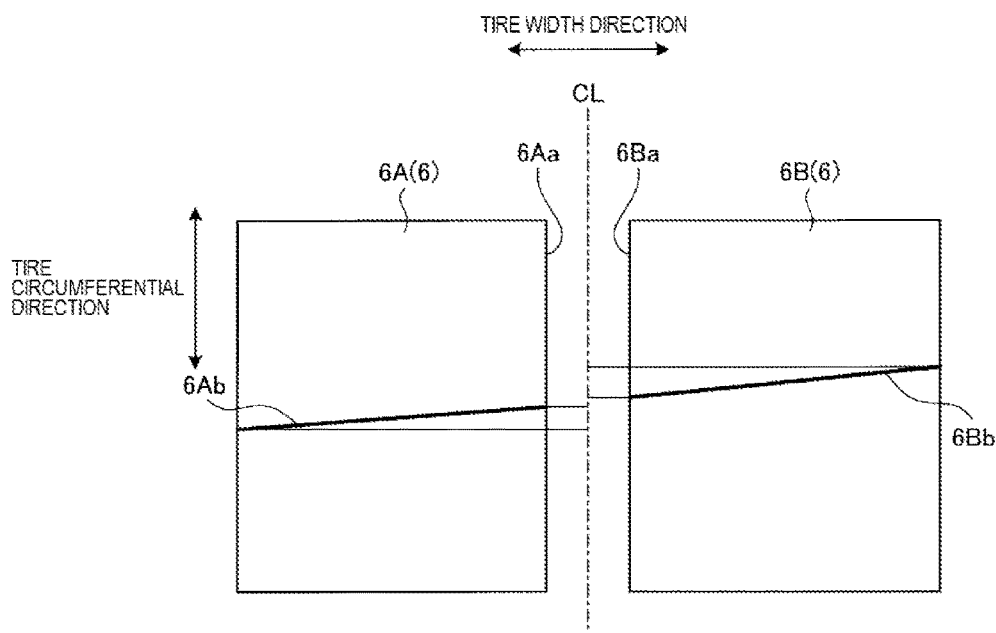
FIG. 10 is a developed view of a strip member showing an example of the arrangement of a joint in the pneumatic tire according to the embodiment of the present technology.

In FIGS. 7 to 9, the carcass layer 6 that is the strip member is shown as in a divided state, and the joints 6Ab and 6Bb coincide. "The joints 6Ab and 6Bb coincide" means that when the joints 6Ab and 6Bb are projected in the tire width direction onto the tire equatorial plane CL, they overlap each other even if by just a portion. As shown in FIG. 8, even when the range of the width J (see FIGS. 3 and 4) of the joints 6Ab and 6Bb are different, the joints 6Ab and 6Bb may extend at an inclination with respect to the radial direction, as shown in FIG. 9. Therefore, in FIG. 10, the joints 6Ab and 6Bb do not coincide. The orientations of the inclination of the joints 6Ab and 6Bb may be both the same orientation, as shown in FIGS. 9 and 10, or may have different orientations, although not shown. Although not shown, in the inner liner layer 8 that is the strip member, the joints 8Ab and 8Bb of the inner liner layer 8 may similarly coincide.

In this way, the pneumatic tire 1 according to the present embodiment includes the strip member (carcass layer 6, the inner liner layer 8, or the like), which extends in the tire circumferential direction, both ends thereof in the tire width direction reaching each of the bead portions 5; and the belt layer 7 disposed in the tread portion 2 on the outer side in the tire radial direction of the strip members, the strip member is divided in the tire width direction, and the divided strip members (divided carcass layers 6A and 6B, or divided inner liner layers 8A and 8B) have joints (6Ab and 6Bb, or 8Ab and 8Bb) that join together in the tire circumferential direction, and the relative positions of the joints are disposed at less than 20° with respect to the tire circumferential direction within the region of the maximum width TW in the tire width direction of the belt layer 7.

According to this pneumatic tire 1, the relative positions of the joints of the divided strip members in the tire width direction are disposed within the region in the tire circumferential direction corresponding to the ground contact length GL within the region of the maximum width TW in the tire width direction of the belt layer 7. The above region TW is easily affected by the forces acting with respect to the tire width direction (LFV), and by disposing the relative positions of the joints in the region corresponding to the ground contact length GL, the forces acting in the tire width direction cancel each other out, and the peak force acting in the tire width direction is reduced, so it is possible to improve the uniformity.

Furthermore, in the pneumatic tire 1 according to the present embodiment, it is preferable that the strip members are at least one selected from the carcass layer 6 having both ends thereof in the tire width direction folded around each of the bead portions 5, or the inner liner layer 8 that is applied to the tire inner surface.

According to this pneumatic tire 1, by configuring at least one of the carcass layer 6 and the inner liner layer 8 within the region of the maximum width TW in the tire width direction of the belt layer 7 as described above, it is possible to obtain a significant effect of improvement in uniformity. The strip members are not limited to the carcass layer 6 and the inner liner layer 8. Provided it is a strip member (for example, a reinforcing layer) that is within the region of the maximum width TW in the tire width direction of the belt layer 7, it is possible to obtain a significant effect of improvement in uniformity by the above configuration.

Moreover, in the pneumatic tire 1 according to the present embodiment, if the strip member includes the carcass layer 6 and inner liner layer 8, it is preferable that the relative positions of the joints 6Ab and 6Bb, and 8Ab and 8Bb of the carcass layer 6 and the inner liner layer 8 with respect to the tire width direction are disposed at less than 20° in the tire circumferential direction within the region of the maximum width TW in the tire width direction of the belt layer 7.

According to this pneumatic tire 1, by configuring the carcass layer 6 and the inner liner layer 8 as described above, the forces in the tire width direction acting on the carcass layer 6 cancel each other out and the peak force acting in the tire width direction is reduced, and the forces in the tire width direction acting on the inner liner layer 8 cancel each other out and the peak force acting in the tire width direction is reduced, so it is possible to obtain a significant effect of improvement in uniformity.

Furthermore, in the pneumatic tire 1 according to the present embodiment, it is preferable that of each strip member (carcass layer 6, inner liner layer 8, or the like) that are opposite each other in the tire width direction, the relative positions of the joints (6Ab and 6Bb, and 8Ab and 8Bb) that join in the tire circumferential direction are disposed so that they coincide in the tire circumferential direction within the region of the maximum width TW in the tire width direction of the belt layer 7.

According to this pneumatic tire 1, by the configuration described above, the forces acting in the tire width direction effectively cancel each other out and the peak force acting in the tire width direction is further reduced, so it is possible to obtain a significant effect of improvement in uniformity.

Also, in the pneumatic tire 1 according to the present embodiment, if one of the strip members (carcass layer 6 or inner liner layer 8 or the like) that are divided in the tire width direction has a plurality of joints (6Ab and 6Bb, or 8Ab, 8Bb) and their total number is A, it is preferable that the spacing of the joints in the tire circumferential direction is within the range of not less than $(360°/A)\times(+0.7)$ and not greater than $(360°/A)\times(+1.3)$, and the plurality of joints is disposed with non-uniform spacing in the tire circumferential direction.

Figure 11:
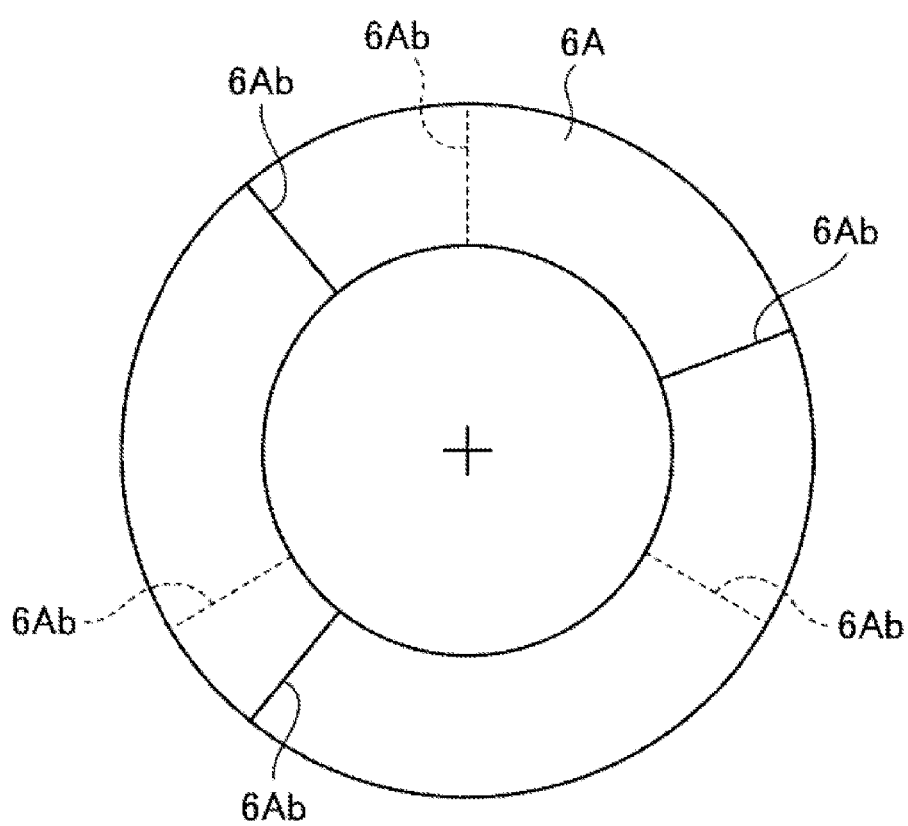
FIG. 11 is a side view of a strip member showing a joint in the pneumatic tire according to the embodiment of the present technology.

According to this pneumatic tire 1, as shown in the side view of the strip member showing the joints in the pneumatic tire according to the present embodiment in FIG. 11, in a case where the total number of joints A is three (in FIG. 11 the strip member is the carcass layer 6 and the joints 6Ab of the divided carcass layer 6A are shown), the spacing of the joints 6Ab in the tire circumferential direction is not less than 84° and not greater than 156°. If the spacing of the three joints 6Ab in the tire circumferential direction is uniform, the spacing becomes 120° as indicated by the broken lines in FIG. 11, the peak positions of the forces acting in the tire width direction become the uniform positions in the tire circumferential direction of one of the strip members that is divided in the tire width direction, and the uniformity improvement effect tends to be small. Therefore, if the spacing of the three joints 6Ab in the tire circumferential direction is non-uniform spacing within the range of not less than 84° and not greater than 156° (in FIG. 11 clockwise from the top the angles are 110°, 150°, and 100°), the peak positions of the force acting in the tire width direction become non-uniform positions in the tire circumferential direction of the one strip member that is divided in the tire width direction, and uniformity improvement effect is increased. In the present embodiment, the non-uniform spacing may include, for example, clockwise 150°, 105°, and 105°.

If the carcass layer 6 and the inner liner layer 8 as strip members are divided, and the total number of the plurality of joints in one of the carcass layer or inner liner layer that are divided in the tire width direction is A, it is preferable that the spacing of the joints in the tire circumferential direction is within the range of not less than (360°/A)×(+0.7) and not greater than (360°/A)×(+1.3), and the plurality of joints has unequal spacing in the tire circumferential direction. According to this, the uniformity improvement effect is increased, including the carcass layer 6 and the inner liner layer 8.

Figure 12:
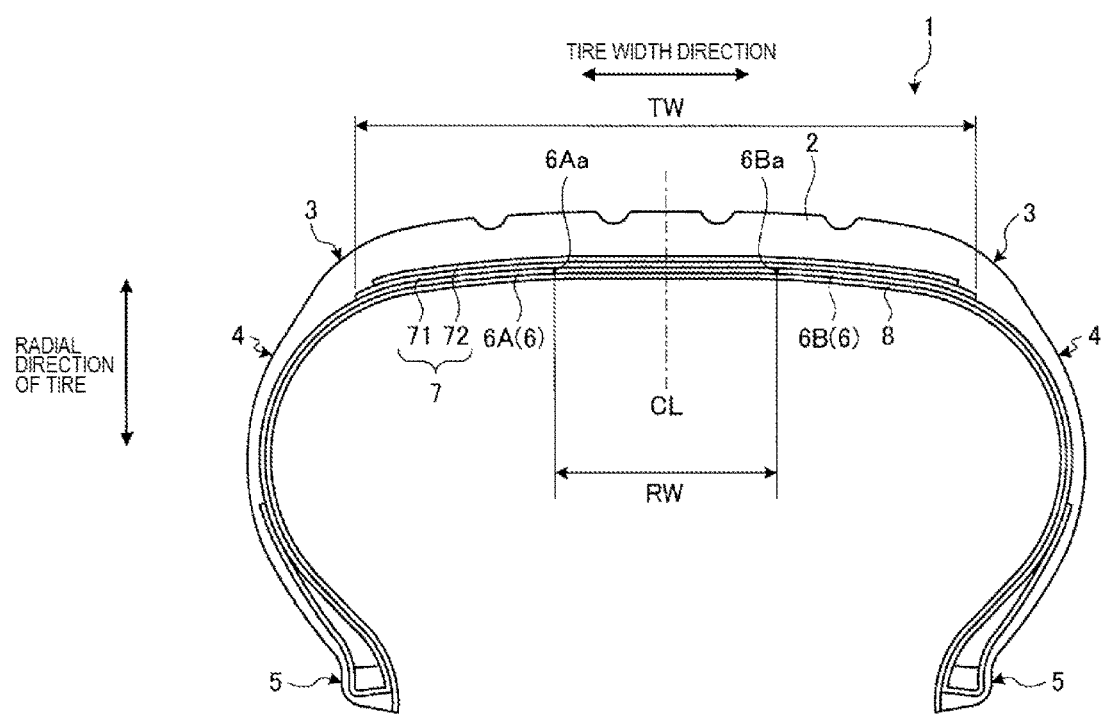
FIG. 12 is a meridian cross-sectional view showing an example of a carcass layer of the pneumatic tire according to an embodiment of the present technology.

Also, in the pneumatic tire 1 according to the present embodiment, as shown in the meridian cross-sectional view of FIG. 12 which shows an example of the carcass layer of the pneumatic tire according to the present embodiment, preferably the divided width RW (dimension in the tire width direction of the divided edges 6Aa and 6Ba) of each divided carcass layer (divided carcass layer 6A or 6B) is not less than −30% and not greater than 95% of the maximum width TW in the tire width direction of the belt layer 7.

Here, "the divided width RW is −30% of the maximum width TW in the tire width direction of the belt layer 7" refers to the dimension in the tire width direction of the divided edges 6Aa and 6Ba when the divided carcass layers 6A and 6B overlap with each other so that the divided edge 6Aa overlaps with the divided carcass layer 6B and the divided edge 6Ba overlaps with the divided carcass layer 6A. In other words, when the divided carcass layers 6A and 6B mutually overlap, it is preferable that the divided width RW is not less than −30% of the maximum width TW in the tire width direction of the belt layer 7, and if the divided edges 6Aa and 6Ba of the divided carcass layers are separated, it is preferable that the divided width RW is not greater than 95% of the maximum width TW in the tire width direction of the belt layer 7. If the divided width RW is less than −30% of the maximum width TW in the tire width direction of the belt layer 7, the tire mass tends to increase, and if the divided width RW exceeds 95% of the maximum width TW in the tire width direction of the belt layer 7, the amount of overlap of the carcass layer 6 and the belt layer 7 is reduced, and the tire durability tends to be reduced.

EXAMPLES

FIGS. 13 to 15C are tables showing test results for pneumatic tires according to working examples. In these working examples, tests were carried out for the uniformity, tire mass, and durability for various types of pneumatic tire under different conditions.

In the tests, pneumatic tires of tire size 235/40R18 were used as the test tires.

The method of evaluating the uniformity was to measure the lateral force variation (LFV) in accordance with the method of measurement "Test Procedures for Automobile Tire Uniformity" JASO 607, for each of the test tires which was assembled onto the regular rim, which was filled with the regular inner pressure (180 kPa), and to which the regular load was applied. Evaluations were performed by indexing the measurement results with the conventional example as the standard score (100). Greater index scores indicate enhanced uniformity.

The method of evaluation of the tire mass was to measure the mass of each of the test tires using a weighing machine. Evaluations were performed by indexing the measurement results with the conventional example as the standard score (100). Greater index scores indicate a lighter tire mass which is preferable.

The method of evaluating the durability was to install each of the test tires which was assembled onto the regular rim and which was filled with the regular inner pressure (180 kPa) onto a drum test machine with drum diameter 1707 mm, and to measure the external appearance of the tire and occurrences of internal damage after driving the tire at a speed of 81 km/h and an ambient temperature of 38±3° C. with 85% of the maximum load defined by JATMA for 4 hours, 90% for 6 hours, 100% for 24 hours, 115% for 4 hours, 130% for 4 hours, 145% for 4 hours, and 160% for 4 hours. ○ indicates no damage, and × indicates occurrence of damage.

As shown in FIG. 13, in the pneumatic tire according to the Conventional Example, the carcass layer and the inner liner layer were not divided. In the pneumatic tire according to Comparative Example 1, the carcass layer was divided in the tire width direction, but the relative positions of the joints of each of the divided carcass layers were not less than 20° in the tire circumferential direction within the region of the maximum width in the tire width direction of the belt layer.

On the other hand, as shown in FIG. 13, in the pneumatic tires according to Working Example 1 to Working Example 8, the carcass layer was divided in the tire width direction, and the relative positions of the joints of the divided carcass layers were less than 20° in the tire circumferential direction within the region of the maximum width in the tire width direction of the belt layer. In the pneumatic tire according to Working Example 1, each divided carcass layer had one joint. In the pneumatic tire according to Working Example 2, each divided carcass layer had a plurality of joints, the spacing thereof in the tire circumferential direction was within the range of not less than (360°/A)×(+0.7) and not greater than (360°/A)×(+1.3), disposed uniformly in the tire circumferential direction. In the pneumatic tires according to Working Examples 3 to 8, each divided carcass layer had a plurality of joints, the spacing thereof in the tire circumferential direction was within the range of not less than (360°/A)×(+0.7) and not greater than (360°/A)×(+1.3), disposed non-uniformly in the tire circumferential direction. In the pneumatic tires according to Working Examples 5 to 7, the divided width of the carcass layer was not less than −30% and not greater than 95% of the maximum width of the belt layer.

As shown in FIG. 14, in the pneumatic tire according to the Conventional Example the carcass layer and the inner liner layer were not divided. In the pneumatic tire according to Comparative Example 2, the inner liner layer was divided in the tire width direction, but the relative positions of the joints of the divided inner liner layers were not less than 20° in the tire circumferential direction within the region of the maximum width in the tire width direction of the belt layer.

On the other hand, as shown in FIG. 14, in the pneumatic tires according to Working Example 9 to Working Example 11, the inner liner layer was divided in the tire width direction, and the relative positions of the joints of the divided inner liner layers were less than 20° in the tire circumferential direction within the region of the maximum width in the tire width direction of the belt layer. In the pneumatic tire according to Working Example 9, each divided inner liner layer had one joint. In the pneumatic tire according to Working Example 10, each divided inner liner layer had a plurality of joints, the spacing thereof in the tire circumferential direction was within the range of not less than $(360°/A) \times (+0.7)$ and not greater than $(360°/A) \times (+1.3)$, disposed uniformly in the tire circumferential direction. In the pneumatic tire according to Working Example 11, each divided inner liner layer had a plurality of joints, the spacing thereof in the tire circumferential direction was within the range of not less than $(360°/A) \times (+0.7)$ and not greater than $(360°/A) \times (+1.3)$, disposed non-uniformly in the tire circumferential direction.

As shown in FIGS. 15A-15C, in the pneumatic tire according to the Conventional Example the carcass layer and the inner liner layer were not divided. In the pneumatic tire according to Comparative Example 3, the carcass layer and the inner liner layer were divided in the tire width direction, but the relative positions of the joints of the divided carcass layers and the divided inner liner layers were not less than 20° in the tire circumferential direction within the region of the maximum width in the tire width direction of the belt layer.

On the other hand, as shown in FIGS. 15A-15C, in the pneumatic tires according to Working Example 12 to Working Example 29, the carcass layer and the inner liner layer were divided in the tire width direction, and the relative positions of the joints of each of the divided carcass layers were less than 20° in the tire circumferential direction within the region of the maximum width in the tire width direction of the belt layer. In the pneumatic tire according to Working Example 12, each divided carcass layer and divided inner liner layer had one joint. In the pneumatic tire according to Working Example 13, each divided carcass layer and divided inner liner layer had a plurality of joints, the spacing thereof in the tire circumferential direction was within the range of not less than $(360°/A) \times (+0.7)$ and not greater than $(360°/A) \times (+1.3)$, disposed uniformly in the tire circumferential direction. In the pneumatic tire according to Working Example 14, each divided carcass layer and divided inner liner layer had a plurality of joints, the spacing thereof in the tire circumferential direction was within the range of not less than $(360°/A) \times (+0.7)$ and not greater than $(360°/A) \times (+1.3)$, disposed non-uniformly in the tire circumferential direction for the divided carcass layers, and disposed uniformly for the divided inner liner layers. In the pneumatic tire according to Working Example 15, each divided carcass layer and divided inner liner layer had a plurality of joints, the spacing thereof in the tire circumferential direction was within the range of not less than $(360°/A) \times (+0.7)$ and not greater than $(360°/A) \times (+1.3)$, disposed uniformly in the tire circumferential direction for the divided carcass layers, and disposed non-uniformly for the divided inner liner layers. In the pneumatic tire according to Working Example 16, each divided carcass layer and divided inner liner layer had a plurality of joints, the spacing thereof in the tire circumferential direction was within the range of not less than $(360°/A) \times (+0.7)$ and not greater than $(360°/A) \times (+1.3)$, disposed non-uniformly in the tire circumferential direction for the divided carcass layers and the divided inner liner layers.

The pneumatic tire according to Working Example 17 was the same as Working Example 13 except the positions of the joints of the same layer of the carcass layer and the inner liner layer were less than 20° in the tire circumferential direction. The pneumatic tire according to Working Example 18 was the same as Working Example 14 except the positions of the joints of the same layer of the carcass layer and the inner liner layer were less than 20° in the tire circumferential direction. The pneumatic tire according to Working Example 19 was the same as Working Example 15 except the positions of the joints of the same layer of the carcass layer and the inner liner layer were less than 20° in the tire circumferential direction. The pneumatic tire according to Working Example 20 was the same as Working Example 16 except the positions of the joints of the same layer of the carcass layer and the inner liner layer were less than 20° in the tire circumferential direction. The pneumatic tire according to Working Example 21 was the same as Working Example 17 except the positions of the joints of the carcass layer and the inner liner layer coincided in the tire circumferential direction. The pneumatic tire according to Working Example 22 was the same as Working Example 18 except the positions of the joints of the carcass layer and the inner liner layer coincided in the tire circumferential direction. The pneumatic tire according to Working Example 23 was the same as Working Example 19 except the positions of the joints of the carcass layer and the inner liner layer coincided in the tire circumferential direction. The pneumatic tire according to Working Example 24 was the same as Working Example 20 except the positions of the joints of the carcass layer and the inner liner layer coincided in the tire circumferential direction. The pneumatic tires according to Working Examples 26 to 28 were the same as Working Example 24 except the divided width of the carcass layer was not less than −30% and not greater than 95% of the maximum width of the belt layer.

As shown in the test results of FIGS. 13 to 15C, the pneumatic tires according to Working Examples 1 to 29 had improved uniformity.

The invention claimed is:

1. A pneumatic tire comprising:
   a strip member, which extends in a tire circumferential direction, both ends thereof in a tire width direction reaching each bead portion; and
   a belt layer disposed in a tread portion on an outer side in a tire radial direction of the strip member;
   the strip member being divided in the tire width direction in the tread portion region into first and second divided strip members;
   the first and second divided strip members having joints that join in the tire circumferential direction; and
   relative positions of the joints of the first and second divided strip members, which are opposite each other in the tire width direction, being disposed at less than 20° in the tire circumferential direction within a region of a maximum width in the tire width direction of the belt layer, wherein spacing between the joints of the first divided strip member is non-uniform and spacing between the joints of the second divided strip member is non-uniform.

2. The pneumatic tire according to claim 1, wherein the strip member is at least one selected from a carcass layer having both ends thereof in the tire width direction folded around the each bead portion, or an inner liner layer that is applied to a tire inner surface.

3. The pneumatic tire according to claim 2, wherein the strip members comprise the carcass layer and the inner liner layer, and the relative positions of the joints of the carcass layer and the inner liner layer that are opposite each other in the tire width direction are disposed at less than 20° in the tire circumferential direction within the region of the maximum width in the tire width direction of the belt layer.

4. The pneumatic tire according to claim 3, wherein of each of the strip members that are opposite each other in the tire width direction, the relative positions of the joints that join in the tire circumferential direction coincide in the tire circumferential direction within the region of the maximum width in the tire width direction of the belt layer.

5. The pneumatic tire according to claim 4, wherein the strip member that is divided in the tire width direction comprises a plurality of joints, a total number of the joints being A, and spacing of the joints in the tire circumferential direction is within a range of not less than $(360°/A)\times(+0.7)$ and not greater than $(360°/A)\times(+1.3)$, the plurality of joints being disposed with non-uniform spacing in the tire circumferential direction.

6. The pneumatic tire according to claim 5, wherein the strip member comprises a carcass layer which extends in the tire circumferential direction, both ends thereof in the tire width direction fold around the each bead portion; and a divided width of each of the divided carcass layers is not less than −30% and not greater than 95% of the maximum width in the tire width direction of the belt layer.

7. The pneumatic tire according to claim 4, wherein the strip member comprises a carcass layer which extends in the tire circumferential direction, both ends thereof in the tire width direction fold around the each bead portion; and a divided width of each of the divided carcass layers is not less than −30% and not greater than 95% of the maximum width in the tire width direction of the belt layer.

8. The pneumatic tire according to claim 3, wherein the strip member that is divided in the tire width direction comprises a plurality of joints, a total number of the joints being A, and spacing of the joints in the tire circumferential direction is within a range of not less than $(360°/A)\times(+0.7)$ and not greater than $(360°/A)\times(+1.3)$, the plurality of joints being disposed with non-uniform spacing in the tire circumferential direction.

9. The pneumatic tire according to claim 3, wherein the strip member comprises a carcass layer which extends in the tire circumferential direction, both ends thereof in the tire width direction fold around the each bead portion; and a divided width of each of the divided carcass layers is not less than −30% and not greater than 95% of the maximum width in the tire width direction of the belt layer.

10. The pneumatic tire according to claim 2, wherein of each of the strip members that are opposite each other in the tire width direction, the relative positions of the joints that join in the tire circumferential direction coincide in the tire circumferential direction within the region of the maximum width in the tire width direction of the belt layer.

11. The pneumatic tire according to claim 2, wherein the strip member that is divided in the tire width direction comprises a plurality of joints, a total number of the joints being A, and spacing of the joints in the tire circumferential direction is within a range of not less than $(360°/A)\times(+0.7)$ and not greater than $(360°/A)\times(+1.3)$, the plurality of joints being disposed with non-uniform spacing in the tire circumferential direction.

12. The pneumatic tire according to claim 2, wherein the strip member comprises a carcass layer which extends in the tire circumferential direction, both ends thereof in the tire width direction fold around the each bead portion; and a divided width of each of the divided carcass layers is not less than −30% and not greater than 95% of the maximum width in the tire width direction of the belt layer.

13. The pneumatic tire according to claim 1, wherein of each of the strip members that are opposite each other in the tire width direction, the relative positions of the joints that join in the tire circumferential direction coincide in the tire circumferential direction within the region of the maximum width in the tire width direction of the belt layer.

14. The pneumatic tire according to claim 1, wherein the strip member that is divided in the tire width direction comprises a plurality of joints, a total number of the joints being A, and spacing of the joints in the tire circumferential direction is within a range of not less than $(360°/A)\times(+0.7)$ and not greater than $(360°/A)\times(+1.3)$, the plurality of joints being disposed with non-uniform spacing in the tire circumferential direction.

15. The pneumatic tire according to claim 1, wherein the strip member comprises a carcass layer which extends in the tire circumferential direction, both ends thereof in the tire width direction fold around the each bead portion; and a divided width of each of the divided carcass layers is not less than −30% and not greater than 95% of the maximum width in the tire width direction of the belt layer.

16. The pneumatic tire according to claim 1, wherein each of the divided strip members includes a plurality of the joints.

17. The pneumatic tire according to claim 1, wherein the relative positions of the joints are disposed at greater than 0°.

* * * * *